United States Patent
Oyama et al.

(10) Patent No.: US 8,542,563 B2
(45) Date of Patent: Sep. 24, 2013

(54) RECORDING METHOD FOR OPTICAL DISK AND OPTICAL DISK RECORDING REPRODUCTION DEVICE

(75) Inventors: Katsuhiro Oyama, Gunma (JP); Fuyuki Miyazawa, Gunma (JP); Daizo Yokoyama, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 12/676,810

(22) PCT Filed: Sep. 8, 2008

(86) PCT No.: PCT/JP2008/067212
§ 371 (c)(1),
(2), (4) Date: Jul. 23, 2010

(87) PCT Pub. No.: WO2009/031718
PCT Pub. Date: Mar. 12, 2009

(65) Prior Publication Data
US 2011/0188360 A1    Aug. 4, 2011

(30) Foreign Application Priority Data
Sep. 7, 2007    (JP) .................. 2007-232186

(51) Int. Cl.
*G11B 7/12*    (2012.01)
(52) U.S. Cl.
USPC ..................... 369/47.53; 369/47.49
(58) Field of Classification Search
None
See application file for complete search history.

(56) References Cited

U.S. PATENT DOCUMENTS

| | | | |
|---|---|---|---|
| 2002/0018406 A1* | 2/2002 | Yamada | 369/44.23 |
| 2002/0191512 A1* | 12/2002 | Arioka et al. | 369/47.53 |
| 2003/0169659 A1 | 9/2003 | Miyaki | |
| 2004/0017743 A1 | 1/2004 | Sasaki et al. | |
| 2004/0027959 A1* | 2/2004 | Sasa et al. | 369/59.11 |

(Continued)

FOREIGN PATENT DOCUMENTS

| | | |
|---|---|---|
| JP | 2002-74731 A | 3/2002 |
| JP | 2003-109239 A | 4/2003 |

(Continued)

OTHER PUBLICATIONS

International Search Report (ISR) issued in PCT/JP2008/067212 for Examiner consideration.

(Continued)

*Primary Examiner* — Joseph Feild
*Assistant Examiner* — Carl Adams
(74) *Attorney, Agent, or Firm* — Chen Yoshimura LLP

(57) ABSTRACT

There is proposed an optical disk recording method that can prevent degradation of recording quality due to occurrence of thermal interference, and an optical disk recording reproduction device used in this recording method. The recording method has a step of executing a test record on an output proofing area of the optical disk 150 while a spot diameter of the recording laser beam is varied, and deriving the relationship between the spot diameter and a characteristic value representing recording quality, a step of deriving a permissible range of a variation amount of the spot diameter on the basis of the derived relationship between the spot diameter and the characteristic value representing the recording quality; a step of irradiating a record region of the optical disk with the recording laser beam to detect spherical aberration while executing recording; and a step of executing aberration correction, in case the spherical aberration occurs, such that a variation amount of the spot diameter falls into the derived permissible range.

8 Claims, 4 Drawing Sheets

(56) References Cited

U.S. PATENT DOCUMENTS

2005/0094535 A1    5/2005  Yanagawa
2007/0159951 A1*   7/2007  Sagara ................. 369/106
2007/0291599 A1   12/2007  Oyama et al.

FOREIGN PATENT DOCUMENTS

| JP | 2003-263740 A | 9/2003 |
|----|---------------|--------|
| JP | 2004-62937 A  | 2/2004 |
| JP | 2004-103093 A | 4/2004 |
| JP | 2005-135540 A | 5/2005 |
| JP | 2006-216180 A | 8/2006 |
| JP | 2007-207316 A | 8/2007 |
| JP | 2007323790 A  | 12/2007 |

OTHER PUBLICATIONS

Written Opinion (PCT/ISA/237) issued in PCT/JP2008/067212.
Japanese Office Action dated Feb. 3, 2012, in a counterpart Japanese Patent Application No. 2007-232186.

* cited by examiner

RECORDING METHOD FOR OPTICAL DISK AND OPTICAL DISK RECORDING REPRODUCTION DEVICE

BACKGROUND OF THE INVENTION

1. Technical Field

The present invention relates to a recording method for an optical disk and an optical disk recording reproduction device, and has an object to prevent degradation of recording quality by correcting spherical aberration.

2. Background Art

An optical disk, such as CD-R (recordable CD), DVD±R (recordable DVD), BD-R (write-once type Blu-ray Disc), or the like, has a structure that a recording layer and a reflective layer (and a protection layer as needed) are formed on one surface of an optically transparent disk-shaped substrate. Furthermore, spiral or concentric grooves called as grooves are formed on the surface of the substrate on which the recording layer and the reflective layer are formed, and a projecting portion called as a land is formed between neighboring grooves. With respect to the optical disk as described above, the recording layer on a groove is irradiated with a recording laser beam to form pits, thereby performing recording. The length of the pit, the length of the portion between the pits (hereinafter referred to as a space) and the arrangement of the pits are readout by applying a reproduction laser beam and detecting a reflective light as a reproduction signal, thereby performing reproduction.

With respect to the optical disk as described above, the recording layer is irradiated through an optically transparent layer with the recording laser beam and the reproducing laser beam. Here, in the case of CD-R or DVD±R, the recording layer and the reflective layer are successively formed in that order on the optically transparent disk-shaped substrate (the thickness is equal to 1.2 mm for CD-R and 0.6 mm for DVD±R), and thus the optically transparent disk-shaped substrate corresponds to the optically transparent layer. In the case of BD-R, the reflective layer and the recording layer are successively formed in that order on the optical transparent disk-shaped substrate having a thickness of 1.1 mm, and a transparent cover layer having a thickness of 0.1 mm is formed on the recording layer. Thus, the transparent cover layer corresponds to the optically transparent layer.

In the optical disk as described above, heat is generated when the recording layer is irradiated with the recording laser beam to form the pits. When the generation of this heat is excessive, the shape of the pits may be deformed to a shape different from the normal shape. The deformation of the pits has hitherto caused degradation of recording quality such as a jitter characteristic, etc., for example. In order to prevent the deformation of the pits, the power of the recording laser beam is adjusted. The power adjustment of the recording laser beam is executed as follows.

First, a test recording is executed on an output proofing area (an area called as PCA for DVD-R, for example) at the inner peripheral side of a data record region of the optical disk while the power of the recording laser beam is varied. Subsequently, among the results of this test recording, a result representing excellent recording quality is selected, and is calculated to be regarded as an optimum recording output. Subsequently, recording is executed on the data record region of the optical disk by the recording laser beam having the optimum recording power obtained by the above calculation.

However, the recording sensitivity of the recording layer of the optical disk is not fixed, but varies within each individual disk as well as among individual disks due to the production condition or the like in some cases. In the optical disk as described above, the optimum power of the recording laser beam varies, and thus when the recording is executed while the power of the laser beam is fixed to the power calculated according to the above method, there occurs a portion at which the optimum recording quality cannot be obtained. In view of the foregoing problem, as disclosed in JP-A-2003-263740, for example, a method of detecting a recording state after recording into a data area and correcting the power of the recording laser beam on the basis of the detection result has been proposed.

Furthermore, with respect to the recording of the optical disk, degradation of the recording quality occurs due to warp of the optical disk, variation in thickness of the optically transparent layer, a manufacturing error of tilt of lenses such as an objective lens, etc. at a pickup portion of an optical disk recording reproduction device, etc. For example, with respect to the variation in thickness of the optically transparent layer, there is a problem in that spherical aberration occurs in the spot of a recording laser beam or reproducing laser beam and thus the power of the recording laser beam varies, thereby disturbing the pit shape and degrading the recording quality as a result. Therefore, as disclosed in JP-A-2004-103093, there has been proposed a method of correcting the spherical aberration by using aberration correcting means provided to the optical disk recording reproduction device. Furthermore, the power of the recording laser beam changes due to a correction of aberration, and thus there has been proposed a method of correcting spherical aberration and then correcting the power of the recording laser beam as disclosed in JP-A-2003-109239.

Patent Document 1 JP-A-2003-263740
Patent Document 2 JP-A-2004-103093
Patent Document 3 JP-A-2003-109239

DISCLOSURE OF THE INVENTION

Problem to be Solved by the Invention

The aberration correction is executed by using optical means provided on the optical axis between a light source, such as a laser diode or the like, and an objective lens. For example, a collimator lens or other lens may be used as the aberration correcting means. That is, the aberration correcting means is driven to adjust its distance to the objective lens, thereby executing aberration correction. Since the distance between the aberration correcting means and the objective lens is changed, the incident angle of the laser beam to the objective lens changes, and the NA (Numerical Aperture) also changes.

When the NA changes, the diameter of the spot (spot diameter) changes.

When the spot diameter changes and expands, the irradiation range of the laser beam also expands. In a case where recording is executed by a recording laser beam having an expanded irradiation range, so-called thermal interference in which heat of the irradiated laser beam affects adjacent pits occurs when the space length is short. At the moment when the recording laser beam is irradiated and formation of one pit is finished, heat is accumulated at a portion that is irradiated with the laser beam. At this time, if the portion that is irradiated with the laser beam contains an area where the next pit is formed, this area suffers the mixture of the heat accumulated there and the heat of the laser beam irradiation. This state is equivalent to a state that a laser beam having a higher power than the proper laser power is irradiated. Therefore, the pit shape is disturbed and the recording quality is degraded. That is, the degradation in recording quality may occur due to aberration correction.

This invention is to provide an optical disk recording method that can prevent degradation of recording quality due to occurrence of thermal interference when aberration correction is executed, and an optical disk recording reproduction device using the recording method.

Means of Solving the Problem

As a result of inventors' extensive studies, the inventors have found that there exists a range in which recording quality hardly changes even when the spot diameter varies. That is, it has been found that the degradation of the recording quality can be prevented by executing the aberration correction such that the variation of the spot diameter falls into this range. Therefore, according to first solving means of the present invention, there is provided an optical disk recording method for recording information in an optical disk having a recording layer and an optically transparent layer through which a recording laser beam or a reproducing laser beam applied to the recording layer is transmitted, the method including the step of executing a test record on an output proofing area of the optical disk while a spot diameter of the recording laser beam is varied, and deriving the relationship between the spot diameter and a characteristic value representing recording quality; the step of determining a permissible range of a variation amount of the spot diameter on the basis of the derived relationship between the spot diameter and the characteristic value representing the recording quality; the step of irradiating a record region of the optical disk with the recording laser beam to detect spherical aberration while executing recording; and the step of executing aberration correction, in case the spherical aberration occurs, such that a variation amount of the spot diameter falls into the permissible range.

According to the recording method of the present invention, the range of the spot diameter in which the recording quality hardly varies is specified from the relationship between the spot diameter and the characteristic value representing the recording quality, and the driving amount of the aberration correcting means is limited accordingly, thereby preventing the recording quality from being degraded due to thermal interference.

Furthermore, according to second solving means of the present invention, there is provided a recording and reproducing device for recording information in an optical disk having a recording layer and an optically transparent layer through which a recording laser beam or reproducing laser beam applied to the recording layer is transmitted, the device including an optical pickup unit including a laser diode for emitting the recording laser beam or the reproducing laser beam, an objective lens for focusing a laser beam from the laser diode onto the optical disk, aberration correcting means that is provided between the laser diode and the objective lens and that corrects spherical aberration occurring in the recording laser beam or the reproducing laser beam, and a photo detector for detecting reflective light from the optical disk as a reproduction signal; a signal intensity detector for reading the reproduction signal from the optical pickup unit to detect the intensity of the reproduction signal; a characteristic value detector for reading the reproduction signal from the optical pickup unit to detect a characteristic value used for estimation of recording quality; a spot diameter detector for detecting the spot diameter of the laser beam on the basis of a signal from the signal intensity detector; aberration detecting means for detecting spherical aberration occurring in the recording laser beam or the reproducing laser beam; and an aberration controller for driving the aberration correcting means of the optical pickup unit on the basis of a detection result of the aberration detecting means and for controlling a driving range of the aberration correcting means of the optical pickup unit on the basis of the detection result of the spot diameter detector.

According to the recording and reproducing device of the present invention, the spot diameter and the characteristic value representing the recording quality are detected, the range of the spot diameter in which the recording quality hardly varies is specified on the basis of the above relationship between the spot diameter and the characteristic value, and the range of the driving amount of the aberration correcting means can be controlled on the basis of the above result, whereby the recording quality can be prevented from being degraded due to thermal interference.

Effect of the Invention

According to the present invention, the recording quality can be prevented from being degraded due to variation of the spot diameter caused by the aberration correction.

Figure 1:
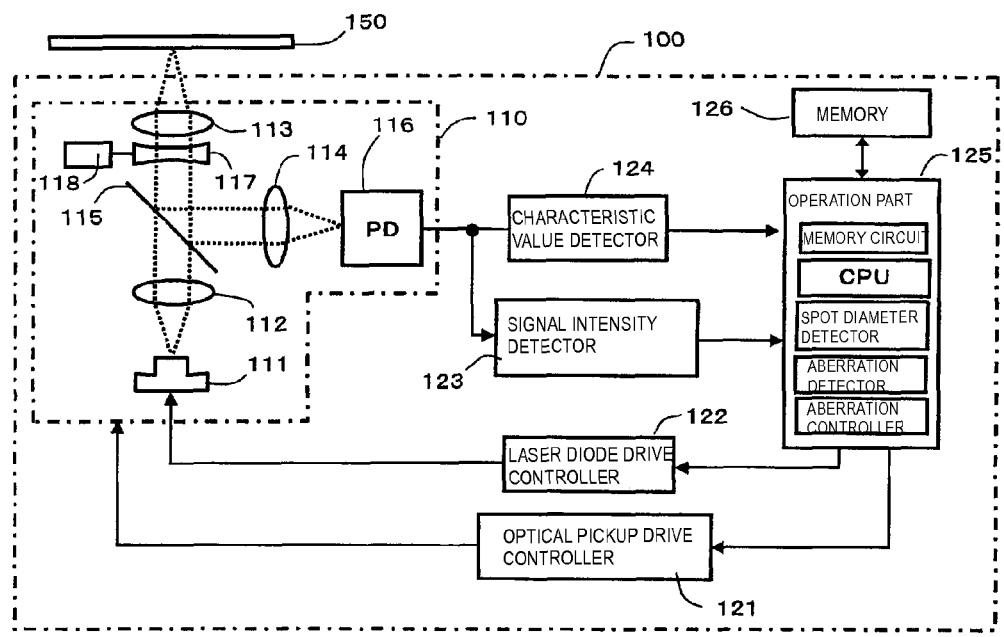
FIG. 1 is a functional block diagram showing an optical disk recording reproduction device according to the present invention.

DESCRIPTION OF REFERENCE NUMERALS 100 optical disk recording reproduction device
110 optical pickup unit
111 laser diode
112 collimate lens
113 objective lens
114 detection lens
115 Beam splitter
116 photo detector
117 aberration correcting means
118 driving means
121 optical pickup drive controller
122 laser diode drive controller
123 signal intensity detector
124 characteristic value detector
125 operation part
126 memory
150 optical disk

BEST MODE FOR CARRYING OUT THE INVENTION

A recording device according to an embodiment of the present invention will be described with reference to FIG. 1. An optical disk recording reproduction device 100 has a memory 126 for storing data in processing, data of processed results, reference data for processing (strategy data corresponding to each media ID, for example), etc., an operation part 125 containing a memory circuit in which programs for executing the processing as described below are recorded, a laser diode drive controller 122 for controlling a recording laser beam and a reproducing laser beam, a signal intensity detector 123 for detecting the intensity of a reproduction signal, a characteristic value detector 124 for detecting the reproduction signal and detecting a characteristic value used to estimate the recording quality, an optical pickup 110, an optical pickup drive controller 121 for controlling the optical pickup 110, a rotational controller (not shown) for the optical disk 150, a servo controller (not shown) for a motor and the optical pickup 110, etc.

Furthermore, the optical pickup 110 has an objective lens 113, a beam splitter 115, a detection lens 114, a collimate lens 112, a laser diode 111, a photo detector 116, aberration correcting means 117 provided between the laser diode 111 and the objective lens 113, and driving means 118 for driving the aberration correcting means 117. A relay lens group as disclosed in JP-A-2003-109239 or a liquid crystal device for controlling refractive index or the like is used as the aberration correcting means. Or, the collimator lens 112 may be operated as the aberration correcting means. An actuator or the like is used as the driving means 118 when the aberration correcting means 117 is a relay lens group or a collimator lens. In the optical pickup 110, the actuator (not shown) operates in accordance with control of the servo controller (not shown) to perform focus and tracking.

The operation part 125 is connected to the memory 126, the signal intensity detector 123, the characteristic value detector 124, the optical pickup drive controller 121, the laser diode drive controller 122, and the rotation controller and the servo controller (not show), etc. Furthermore, the operation part 125 executes a program stored in the memory circuit so as to function as a spot diameter detector, an aberration detector and an aberration controller. The characteristic value detector 124 is connected to the photo detector 116 and the operation part 125. The signal intensity detector 123 is connected to the photo detector 116 and the operation part 125. The optical pickup drive controller 121 is connected to the operation part 125 and the optical pickup 110. The laser diode drive controller 122 is connected to the operation part 125 and the laser diode 111. The operation part 125 is also connected to an input/output system (not shown) through an interface unit (not shown). If an independent optical system sensor (not shown) or the like is used as the means for detecting aberration, the independent optical system sensor is connected to the operation part 125.

Next, the processing when data are recorded in the optical disk 150 will be briefly described. First, the operation part 125 or a data modulation circuit (not shown), which is separately provided, executes modulation processing or the like on data to be written into the optical disk 150, and outputs the modulation-processed data to the laser diode drive controller 122. The laser diode drive controller 122 drives the laser diode 111 on the basis of the received data according to a specified recording condition to output a recording laser beam. The optical disk 150 is irradiated with the recording laser beam through the collimate lens 112, the beam splitter 115, the aberration correcting means 117 and the objective lens 113, whereby pits are formed in the optical disk 150 and also spaces are formed.

Furthermore, the processing when data recorded in the optical disk 150 are reproduced will be briefly described. According to an instruction from the operation part 125, the laser diode drive controller 122 drives the laser diode 111 to output a reproducing laser beam. The optical disk 150 is irradiated with the reproducing laser beam through the collimate lens 112, the beam splitter 115, the aberration correcting means 117 and the objective lens 114. Reflective light from the optical disk 150 is input to the photo detector 116 through the objective lens 113, the aberration correcting means 117, the beam splitter 115 and the detection lens 114. The photo detector 116 converts the reflective light from the optical disk 150 to an electrical signal, and outputs it as a reproduction signal to a data demodulating circuit (not shown) or the like. The data demodulating circuit subjects the output reproduction signal to a predetermined decoding processing, and outputs the decoded data through the operation part 125 and an interface unit (not shown) to the display unit of the input/output system (not shown) to display the reproduced data.

Next, a method of controlling the spot diameter according to the present invention will be described with reference to FIGS. 1 to 3. In this case, the description will be described by using BD-R (spot diameter: $1/e^2$ of peak intensity, about 400 nm) as an example. First, an output proofing area of the optical disk 150 is irradiated with a recording laser beam having an initially set spot diameter to perform recording. At this time, the spot diameter is simultaneously measured, and the measurement result is read into the memory circuit of the operation part 125 or the memory 126. As a method of measuring the spot diameter, a spot profile reconstructing method, or an MTF (Modulation Transfer Function: optical system transfer function) method or the like can be used. According to these methods, the spot diameter is measured on the basis of the signal intensity detected by the signal intensity detector 123.

Subsequently, the recorded pits are irradiated with the reproducing laser beam to detect a characteristic value representing recording quality. The reproduction signal of reflective light from the optical disk 150 is transmitted from the photo detector 116 to the characteristic value detector 124. The characteristic value representing the recording quality is detected in the characteristic value detector 124, and the detection result is read into the memory circuit of the operation part 125 or the memory 126. As the characteristic value representing the recording quality, an asymmetry value, $\beta$ value or the DCJ (Data Clock Jitter) is used. The asymmetry value is a characteristic value representing asymmetry of the waveform (eye pattern) of the reproduction signal, and when the signal level of the shortest pit is represented by 12L, the signal level of the longest pit is represented by 18L, the signal level of the shortest space is represented by 12H and the signal level of the longest space is represented by 18H in the an evaluated circuit system of DC (direct current) connection, the asymmetry value can be represented as follows:

$$\{(18H-18L)/2-(12H-12L)/2\}/(18H-18L).$$

Furthermore, the $\beta$ value is a characteristic value representing asymmetry of the waveform (eye pattern) of the reproduction signal as in the case of the asymmetry value, and when the maximum signal level at the space side is represented by A1 and the maximum signal level at the pit side is represented by A2 in an evaluated circuit system of AC (alternating current) connection, the $\beta$ value can be represented as follows.

$$(A1+A2)/(A1-A2).$$

The DCJ is represented by a standard deviation of variation of pits formed on the optical disk. In this case, the DCJ is used.

Next, the aberration correcting unit 117 is driven to change the spot diameter, and then the output proofing area of the optical disk 150 is irradiated with the recording laser beam again to perform recording. At this time, the driving amount, that is, the movement length of the aberration correcting means 117 is detected together with the measurement of the spot diameter. The driving amount of the aberration correcting means 117 is determined on the basis of the signal from the aberration controller of the operation part 125, and thus the signal of the aberration controller is converted to the data of the length and read into the memory circuit of the operation part 125 or the memory 126. Subsequently, the pits, which are recorded with the changed spot diameter, are irradiated with the reproducing laser beam, and the characteristic value representing the recording quality is detected.

Figure 2:
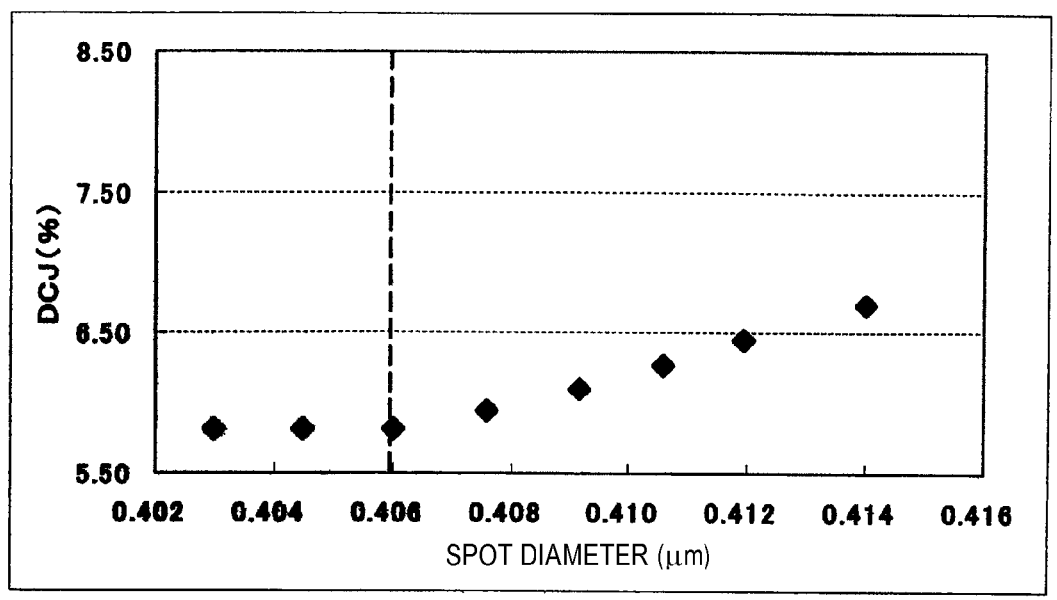
FIG. 2 is a graph showing the relationship between a spot diameter and a characteristic value representing recording quality.

Subsequently, variation of the spot diameter recording into the output proofing area detection of the characteristic value are repeated at a predetermined number of times, and the calculation is performed in the operation part 125 on the basis of the data of the spot diameter and the recording quality (in this case, the DCJ) read in the memory circuit of the operation part 125 or the memory 126, thereby deriving a relationship as shown in the graph of FIG. 2. The permissible range of the variation amount of the spot diameter is determined on the basis of this relationship. In the graph of FIG. 2, variation in the DCJ is hardly observed in the spot diameter range from about 0.403 µm to 0.406 µm, and thus the upper limit of the spot diameter is equal to 0.406 µm. Furthermore, the variation amount of the spot diameter is equal to 0.003 µm.

Figure 3:
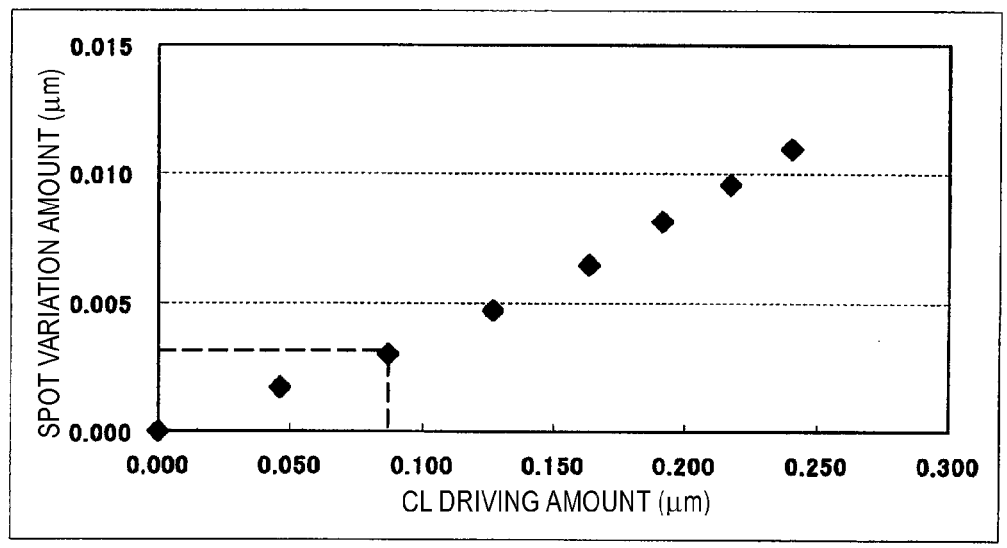
FIG. 3 is a graph showing the relationship between the driving amount of the aberration correcting means and the variation amount of the spot diameter.

Subsequently, the calculation is executed in the operation part 125 on the basis of the data of the variation amount of the spot diameter read in the memory circuit of the operation part 125 or the memory 126 and the detected driving amount of the aberration correcting means 117, thereby deriving a relationship as shown in the graph of FIG. 3. The range of the driving amount of the aberration correcting means 117 which corresponds to the variation amount of the spot diameter as the permissible range is derived from the graph of FIG. 3. In the graph of FIG. 3, the driving amount of the aberration correcting means corresponding to the variation amount (0.003 µm) of the spot diameter is equal to 0.080 mm, and this value is the range of the driving amount of the aberration correcting means 117. The relationship in the graph shown in FIG. 3 relates to the operation of the recording and reproducing device 100, and thus a measurement result, which is obtained in advance, may be read into the memory 126. In the subsequent recording in the record region, the aberration correction is executed within the derived range of the driving amount of the aberration correcting means 117.

Figure 4:
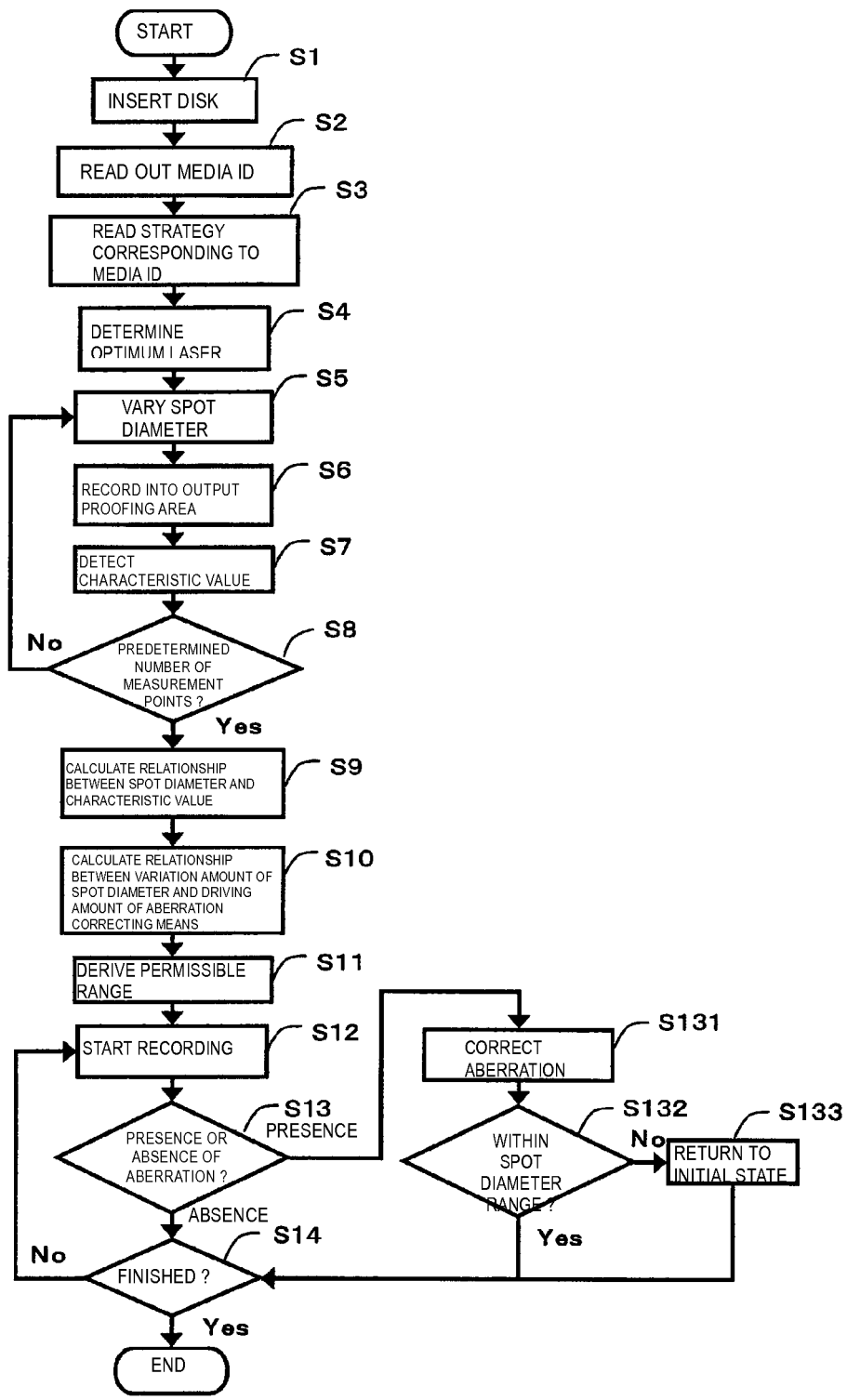
FIG. 4 is a flowchart showing a recording method of the present invention.

Next, the recording method according to the present invention will be described. FIG. 4 is a flowchart showing the procedure of recording into the optical disk 150. First, the optical disk 150 is inserted into the optical disk recording reproduction device 100 (S1). The optical disk recording reproduction device 100 reads out media ID which is recorded in the optical disk 150 in advance (S2). Subsequently, the strategy corresponding to the media ID is read from the memory 126 (S3). Subsequently, the optimum recording power of the recording laser beam is specified according to the read-out strategy data (S4).

Subsequently, in order to derive the relationship between the spot diameter and the characteristic value representing the recording quality, the spot diameter of the recording laser beam is varied to a certain value (S5). At this time, the spot diameter is simultaneously measured, and the measurement result is transmitted to the operation part 125. Here, the first spot diameter is set to the spot diameter which is set by initialization. With respect to the second and subsequent spot diameters, the driving amount of the aberration correcting means 117 is detected together with the measurement of the spot diameter. The number of measurement points of the spot diameter and the interval of the variation amount of the spot diameter, etc., may be determined every time this procedure is conducted. Alternatively, these parameters may be predetermined and read into the memory circuit of the operation part 125 or the memory 126. The maximum amount of the variation amount of the spot diameter is set within the limit of the driving range of the aberration correcting means 117.

Next, a test writing into the output proofing area is started after the spot diameter is determined (S6). A data signal for test recording is transmitted from the operation part 125 to the laser diode drive controller 122, and a control signal is transmitted from the laser diode drive controller 122 to the laser diode 111 on the basis of the data signal. A recording laser beam is output from the laser diode 111 on the basis of the signal from the laser diode drive controller 122. At this time, the conditions, such as the length of the recording data, the lengths of pits and spaces, etc., may be set to be the same as the data for test recording when the optimum recording power is determined.

Next, the recording laser beam is switched to the reproducing laser beam, the test recording data is reproduced, and the characteristic value representing the recording quality is detected from the obtained reproduction signal (S7). The reproduction signal of the test recording data is transmitted to the characteristic value detector 124, and the characteristic value representing the recording quality such as the asymmetry value, the β value, DCJ or the like is detected in the characteristic value detector 124. The detected characteristic value is transmitted to and read into the operation part 125.

Subsequently, it is determined whether the number of measurement points reaches a predetermined number with respect to the measurement of the spot diameter and the detection of the characteristic value representing the recording quality (S8). When the number of measurement points does not reach the predetermined number, the step S5 to the step S6 are repeated.

When the number of measurement points reaches the predetermined number in step S8, the relationship between the data of the spot diameter obtained through the measurement and the detected characteristic value is determined by calculation (S9). The data of the spot diameter obtained in step S5 and the characteristic value obtained in step S7 are subjected to calculation processing in the operation part 125, and a relationship such as shown in the graph of FIG. 2 is derived.

Subsequently, the relationship between the variation amount of the spot diameter and the driving amount of the aberration correcting means 117 is determined by calculation (S10). Data sampled in step S5 or data which are stored in advance in the memory 126 or the like may be used as the data of the variation amount of the spot diameter and the data of the driving amount of the aberration correcting means 117. The obtained data are subjected to calculation processing in the operation part 125, and a relationship such as shown in the graph of FIG. 3 is derived.

Subsequently, the permissible range of the driving amount of the aberration correcting means 117 is derived on the basis of the relationship between the spot diameter and the characteristic value, which has been derived in step S9, and the relationship between the variation amount of the spot diameter and the driving amount of the aberration correcting means 117, which has been derived in step S10 (S11). The derived permissible range is transmitted to the aberration controller. This aberration controller drives the aberration correcting means 117 within the permissible range.

After the permissible range of the driving amount of the aberration correcting means 117 is determined, the recording into the record region is started with the laser power determined in step S4 and at the initially-set spot diameter (S12). Simultaneously with the recording into the record region, the presence or absence of the spherical aberration is detected (S13). The spherical aberration can be detected using a spot profile reconstructing method, a detection method based on the signal intensity detected by the signal intensity detector 123, such as a FE (Focus Error) signal or the like, or using an independent optical system sensor or the like.

When no spherical aberration occurs, the step S12 to step S13 are repeated until the recording into the optical disk 150 is finished (S14). When spherical aberration occurs, the aberration correction is executed (S131). When occurrence of spherical aberration is detected in the aberration detector, a signal is transmitted to the aberration controller. On the basis of this signal, a control signal is transmitted from the aberration controller to the driving means 118, and the aberration correcting means 117 is driven. The driving amount of the aberration correcting means 117 at this time is sampled.

When the aberration detector no longer detects the spherical aberration, it is determined whether the driving amount of the aberration correcting means 117, which is sampled in step S131, is within the permissible range derived in step S11 (S132). When the driving amount is within the permissible range, the processing goes to step S14 under the state that the aberration correction is executed. On the other hand, when the driving amount is out of the permissible range, the spot diameter is returned to the initial state (S133), and then the processing goes to step S14.

The recording method according to the present invention has been described with reference to the flowchart of FIG. 4. However, the procedure of the flowchart is read into the memory circuit of the operation part 125 in a program style, whereby the program can be executed in an existing optical disk recording reproduction device. Accordingly, the aberration correction and information recoding of excellent recording quality can be performed at low cost.

The invention claimed is:

1. An optical disk recording method for recording information in an optical disk having a recording layer and an optically transparent layer through which a recording laser beam or a reproducing laser beam applied to the recording layer is transmitted, the method comprising the steps of:
    executing a test record on an output proofing area of the optical disk while a spot diameter of the recording laser beam is varied, and deriving a relationship between the spot diameter and a characteristic value representing recording quality;
    determining a permissible range of a variation amount of the spot diameter within which the characteristic value is acceptable on the basis of the derived relationship between the spot diameter and the characteristic value representing the recording quality;
    irradiating a record region of the optical disk with the recording laser beam to detect spherical aberration while executing recording; and
    executing aberration correction on the recording laser beam, in case the spherical aberration occurs, by driving an aberration correcting unit, wherein if, in order to execute aberration correction, the aberration correction unit needs to be driven such that the corresponding spot diameter of the recording laser beam would fall outside of the permissible range of the variation amount of the spot diameter determined in the step of determining the permissible range, the aberration correction is not executed, so that a variation amount of the spot diameter falls into the permissible range when the aberration correction is executed.

2. The optical disk recording method according to claim 1, wherein the step of executing a test record includes switching the recording laser beam to a reproducing laser beam and reproducing data recorded in the test record by the reproducing laser beam to detect the characteristic value representing the recording quality.

3. The optical disk recording method according to claim 1, wherein the step of determining the permissible range of the variation amount of the spot diameter includes identifying a range of the spot diameter within which the characteristic value does not significantly change in the derived relationship between the spot diameter and the characteristic value, and regarding the identified range as said permissible range.

4. The optical disk recording method according to claim 1, wherein the characteristic value is a Data Clock Jitter (DCJ).

5. A recording and reproducing device for recording information in an optical disk having a recording layer and an optically transparent layer through which a recording laser beam or reproducing laser beam applied to the recording layer is transmitted, the device comprising:
    an optical pickup unit including a laser diode for emitting the recording laser beam or the reproducing laser beam, an objective lens for focusing a laser beam from the laser diode onto the optical disk, aberration correcting means that is provided between the laser diode and the objective lens and that corrects spherical aberration occurring in the recording laser beam or the reproducing laser beam, and a photo detector for detecting reflective light from the optical disk as a reproduction signal;
    a signal intensity detector for reading the reproduction signal from the optical pickup unit to detect the intensity of the reproduction signal;
    a characteristic value detector for reading the reproduction signal from the optical pickup unit to detect a characteristic value used for estimation of recording quality;
    a spot diameter detector for detecting the spot diameter of the laser beam on the basis of a signal from the signal intensity detector;
    aberration detecting means for detecting spherical aberration occurring in the recording laser beam or the reproducing laser beam; and
    an aberration controller for driving the aberration correcting means of the optical pickup unit to correct the spherical aberration on the basis of a detection result of the aberration detecting means during recording of a record region of the optical disk, the aberration controller driving the aberration correcting means within a permissible range within which the characteristic value is acceptable, the permissible range been determined by executing a test record on an output proofing area of the optical disk while a spot diameter of the recording laser beam is varied and by deriving a relationship between the spot diameter of the recording laser beam and the characteristic value of data recorded in the test record, and
    wherein if, in order to correct the spherical aberration, the aberration correcting means needs to be driven outside of the permissible range, the aberration correction is not executed, so that the aberration correcting means is driven within the permissible range when the aberration correction is executed.

6. The recording and reproducing device according to claim 5, wherein the characteristic value of data recorded by the test record is detected by switching the recording laser beam to a reproducing laser beam and reproducing data recorded in the test record by the reproducing laser beam.

7. The recording and reproducing device according to claim 5, wherein the permissible range is determined by identifying a range of the spot diameter within which the characteristic value does not significantly change in the derived relationship between the spot diameter and the characteristic value, and regarding the identified range as said permissible range.

8. The recording and reproducing device according to claim 5, wherein the characteristic value is a Data Clock Jitter (DCJ).

\* \* \* \* \*